US011716144B2

United States Patent
Shimizu et al.

(10) Patent No.: US 11,716,144 B2
(45) Date of Patent: Aug. 1, 2023

(54) OPTICAL TRANSMITTING SYSTEM AND OPTICAL TRANSMITTING METHOD

(71) Applicant: NIPPON TELEGRAPH AND TELEPHONE CORPORATION, Tokyo (JP)

(72) Inventors: Shimpei Shimizu, Musashino (JP); Takayuki Kobayashi, Musashino (JP); Yutaka Miyamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/777,545

(22) PCT Filed: Nov. 28, 2019

(86) PCT No.: PCT/JP2019/046585
§ 371 (c)(1),
(2) Date: May 17, 2022

(87) PCT Pub. No.: WO2021/106147
PCT Pub. Date: Jun. 3, 2021

(65) Prior Publication Data
US 2022/0399940 A1 Dec. 15, 2022

(51) Int. Cl.
*H04B 10/00* (2013.01)
*H04B 10/2507* (2013.01)
*H04B 10/61* (2013.01)

(52) U.S. Cl.
CPC ..... *H04B 10/2507* (2013.01); *H04B 10/6165* (2013.01)

(58) Field of Classification Search
CPC ............ H04B 10/2507; H04B 10/6165; H04B 10/2543; H04B 10/291; H04B 10/29;
(Continued)

(56) References Cited

U.S. PATENT DOCUMENTS

| 9,270,076 B2* | 2/2016 | Takasaka ............. H04B 10/294 |
| 2014/0099127 A1* | 4/2014 | Tian ................... H04B 10/2507 |
| | | 398/152 |
| 2015/0036210 A1* | 2/2015 | Asobe .................. H01S 3/0092 |
| | | 359/341.3 |

FOREIGN PATENT DOCUMENTS

JP 2015161827 A 9/2015

OTHER PUBLICATIONS

Takeshi Kimura et al., Optical QPSK Signal Quality Degradation due to Phase Error of Pump Light in Optical Parametric Phase-Sensitive Amplifier Repeaters, IEICE Transactions on Communications, vol. E102-B, No. 4, 2019.

(Continued)

*Primary Examiner* — Hanh Phan
(74) *Attorney, Agent, or Firm* — Harness, Dickey & Pierce, P.L.C.

(57) ABSTRACT

An optical transmission system includes: a transmission unit configured to co-propagate a signal light in which data is modulated and an idler light having complex amplitude that is phase conjugate with the signal light via an optical transmission medium; at least one optical amplifier configured to perform a phase sensitive amplification operation through an action among the signal light, the idler light, and an excitation light in a nonlinear medium; and a reception unit configured to receive the signal light that has been amplified by the optical amplifier, coherently detect the signal light and the idler light individually, and conduct a diversity synthesis to demodulate the data.

5 Claims, 4 Drawing Sheets (58) Field of Classification Search
CPC ....... H04B 10/532; H04B 10/61; H04J 14/02; H04J 14/06; H01S 3/06754; H01S 3/10023
USPC ....... 398/158, 159, 160, 154, 155, 136, 202, 398/208, 209, 204, 205, 207, 79, 65, 152, 398/173, 174, 175, 178, 183, 184, 188; 359/333, 337, 341.02, 341.3
See application file for complete search history.

(56) References Cited

OTHER PUBLICATIONS

T. Umeki et al., First Demonstration of High-Order QAM Signal Amplification in PPLN-based Phase Sensitive Amplifier, European Conference and Exhibition on Optical Communication, Sep. 22, 2013.

Masafumi Koga et al., Nonlinear Phase-shift Cancellation by Maximum-Ratio Combining WDM Phase-conjugate Diversity lights Transmitted Through Multi-core Fiber, 2015 European Conference on Optical Communication (ECOC), Sep. 27, 2015.

* cited by examiner

OPTICAL TRANSMITTING SYSTEM AND OPTICAL TRANSMITTING METHOD

CROSS-REFERENCE TO RELATED APPLICATIONS

This application is a 371 U.S. National Phase of International Application No. PCT/JP2019/046585, filed on Nov. 28, 2019. The entire disclosure of the above application is incorporated herein by reference.

TECHNICAL FIELD

The present invention relates to an optical transmission system and an optical transmission method.

BACKGROUND ART

Repeaters are widely used mainly in long-distance optical fiber transmission. The repeaters compensate for attenuation of light intensity that occurs as light propagates within optical fibers. As such repeaters, amplifiers that are classified into phase insensitive amplifiers (PIA) are commonly used these days. Typical examples of the phase insensitive amplifiers include erbium doped fiber amplifiers (EDFA).

In an amplifier, in general, unavoidable spontaneous emission light that is randomly generated independent of a signal component is mixed into an optical signal. For this reason, it is known that in phase insensitive amplifiers, noise figure (NF) is at least 3 [dB] or more as a theoretical limit (standard quantum limit). The NF denotes an index indicating the degree of degradation in signal to noise ratio (SNR) between input and output in amplification of the optical signal. Such degradation in SNR leads to an increase in transmission code error rate at the time of digital signal transmission, and is a factor that degrades transmission quality.

On the other hand, studies of phase sensitive amplifiers (PSA) have been carried out as amplifiers capable of amplifying the light intensity while achieving the NF of less than 3 [dB]. The phase sensitive amplifiers are capable of suppressing the spontaneous emission light including an orthogonal phase independent of the signal component. The standard quantum limit is in principle [0 dB], because in-phase spontaneous emission light is also the minimum. A non-degenerate phase sensitive amplifier (ND-PSA), which is one type of phase sensitive amplifiers, in particular, has superior characteristics of being capable of supporting multi-level modulation signals and wavelength division multiplex signals and also compensating for nonlinear noises (see, for example, PTL 1).

The non-degenerate phase sensitive amplifier is an amplifier that generates, at a transmitter side, an idler light that is a phase conjugate light of the signal light, co-propagating the light on an identical transmission medium, and causing the light to input into a nonlinear medium, so as to obtain a phase sensitive amplification operation from interactions through nonlinear optical effects among the signal light, the idler light, and the excitation light. Here, the idler light is generated by a signal light and an excitation light being input into a nonlinear medium. In a case where the signal light is a wavelength division multiplex signal, the idler light is also generated by the number of the signal lights that have been subject to wavelength multiplexing, but is collectively generated by an identical excitation light.

CITATION LIST

Patent Literature

PTL 1: JP 2015-161827 A

Non Patent Literature

NPL 1: T. Kimura, Y. Okamura, and A. Takada, "Optical QPSK Signal Quality Degradation due to Phase Error of Pump Light in Optical Parametric Phase-Sensitive Amplifier Repeaters," IEICE Transactions on Communications, Vol. E102-B No. 4, 2019.

SUMMARY OF THE INVENTION

Technical Problem

In order to achieve an ideal operating state of a phase sensitive amplifier, precise phase synchronization that synchronizes the relative phases of the signal light and the excitation light is required. In a non-degenerate phase sensitive amplifier, an excitation light of an amplifier has to be synchronized in phase with a fundamental phase between the signal light and the idler light, that is, the excitation light used for generating the idler light. However, it is difficult to constantly achieve this phase synchronization due to phase noise from an excitation light source, a shot noise, and time fluctuations in the transmission line state, such as a polarization or a phase drift. In a case where a phase shift occurs between the signal light and the excitation light in the related art, the signal light that has been output is exposed to the phase noise. Additionally, an intensity noise is generated due to an amplification gain being dependent on a phase difference. The above phase noise and intensity noise leads to a drawback of degrading the transmission quality.

In view of the above-described circumstances, an object of the present invention is to provide a technique capable of suppressing degradation of transmission quality.

Means for Solving the Problem

One aspect of the present invention is an optical transmission system including: a transmission unit configured to co-propagate a signal light in which data is modulated and an idler light having complex amplitude that is phase conjugate with the signal light via an optical transmission medium; at least one optical amplifier configured to perform a phase sensitive amplification operation through an action among the signal light, the idler light, and an excitation light in a nonlinear medium; and a reception unit configured to receive the signal light that has been amplified by the optical amplifier, coherently detect the signal light and the idler light individually, and conduct a diversity synthesis to demodulate the data.

In addition, one aspect of the present invention is an optical transmission method implemented by a computer. The optical transmission method includes: co-propagating a signal light in which data is modulated and an idler light having complex amplitude that is phase conjugate with the signal light via an optical transmission medium; performing, at least once, a phase sensitive amplification operation through an action among the signal light, the idler light, and an excitation light in a nonlinear medium; and receiving the signal light that has been amplified, coherently detecting the signal light and the idler light individually, and conducting a diversity synthesis to demodulate the data.

Effects of the Invention

According to the present invention, the degradation of the transmission quality can be suppressed.

DESCRIPTION OF EMBODIMENTS

Hereinafter, an optical transmission system and an optical transmission method according to an embodiment of the present invention will be described with reference to the drawings.

Configuration of Optical Transmission System

Figure 1:
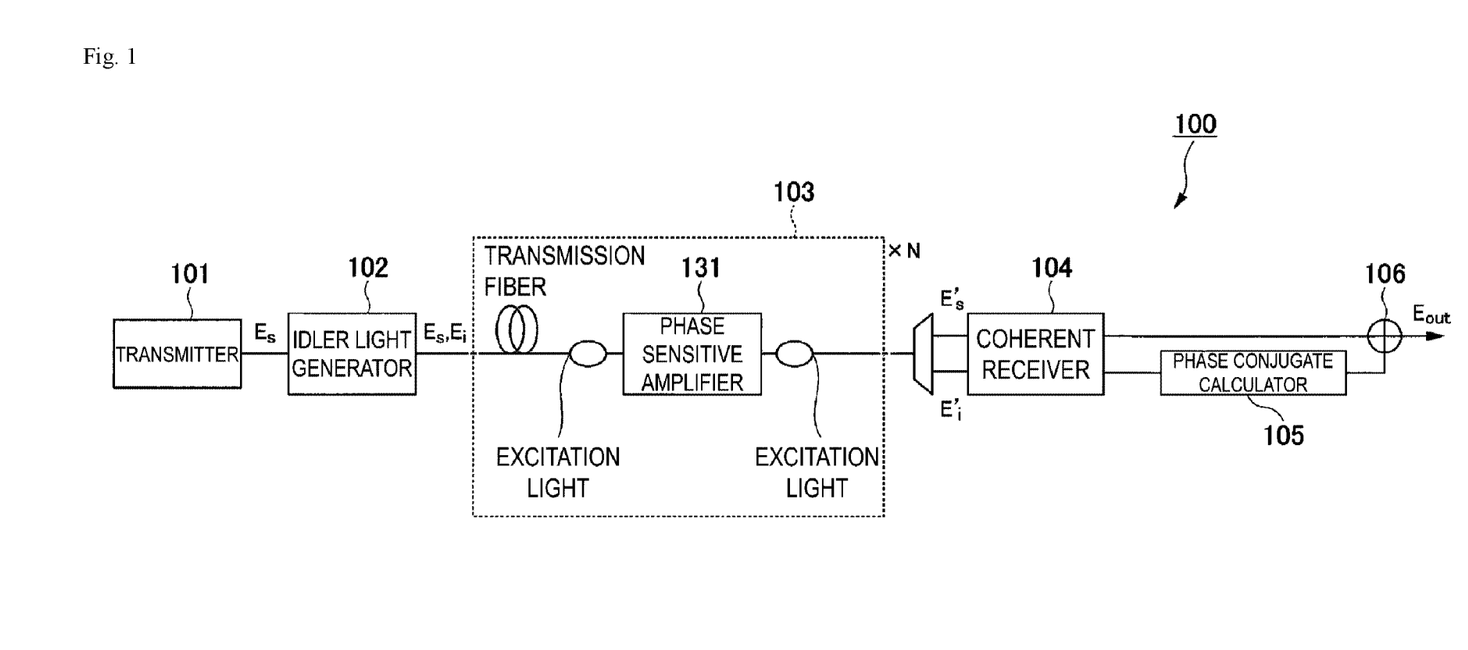
FIG. 1 is a block diagram illustrating a configuration of an optical transmission system 100.

Hereinafter, a configuration of an optical transmission system 100 will be described. FIG. 1 is a block diagram illustrating the configuration of the optical transmission system 100 according to an embodiment of the present invention. As illustrated in FIG. 1, the optical transmission system includes a transmitter 101, an idler light generator 102, a repeater 103, a coherent receiver 104, a phase conjugate calculator 105, and a synthesis unit 106.

The optical transmission system 100 is a system that transmits signals through a repeater including a non-degenerate phase sensitive amplifier (ND-PSA). Use of a non-degenerate phase sensitive amplifier causes the idler light to be a phase conjugate light of the signal light and appropriate settings of a phase relationship of the light waves that interact enable support for multi-level modulation signals and wavelength division multiplex signals. In the non-degenerate phase sensitive amplifier, in a case where the phase noise in an identical direction is added to the signal light and the idler light, the idler light has an antiphase signal with respect to the signal light, and thus the phase noise is canceled.

The transmitter 101 modulates data to generate a signal light. The transmitter 101 outputs the signal light that has been generated to the idler light generator 102.

The idler light generator 102 acquires the signal light that has been output from the transmitter 101. The idler light generator 102 generates an idler light with complex amplitude that is phase conjugate with the signal light that has been acquired. The idler light generator 102 transmits the idler light that has been generated and the signal light to the repeater 103 via a transmission fiber, for example, an optical fiber or the like. Here, the idler light generator 102 performs phase synchronization on the signal light and the idler light and co-propagates the signal light and the idler light.

Note that the phase conjugate refers to an operation of generating complex conjugate of photoelectrolysis complex amplitude. When a signal light $E_s(\omega_s)$ and an excitation light $E_p(\omega_p)$ are incident on a third-order nonlinear optical material, an idler light with an angular frequency $2\omega_p-\omega_s$ is generated. The complex amplitude of the idler light is proportional to $|E_p(\omega_p)|^2 E_s(\omega_s)^*$, so it can be understood that the idler light becomes a phase conjugate wave of the signal light. Note that the transmitter 101 and the idler light generator 102 are examples of a transmission unit. Note that the transmission fiber is an example of an optical transmission medium.

The signal light and the idler light that have been output from the idler light generator 102 are subject to N times of repeater amplification by the repeaters 103. Although only one repeater 103 is illustrated in FIG. 1, assuming that similar N repeaters 103 are actually connected in series.

The repeater 103 acquires the signal light and the idler light that have been output from the idler light generator 102 or another repeater 103. The repeater 103 has a configuration in which a phase sensitive amplifier 131 is included.

The phase sensitive amplifier 131 is a non-degenerate phase sensitive amplifier (ND-PSA), which is one of optical amplifiers. The phase sensitive amplifier 131 performs a phase sensitive amplification operation through an action among the signal light, the idler light, and the excitation light in the nonlinear medium. In this operation, the phase sensitive amplifier 131 amplifies the signal light and the idler light that has been acquired. Note that the excitation light is emitted from an excitation light source, not illustrated.

Note that the phase sensitive amplifier 131 has a characteristic of amplifying the signal light when the fundamental phase between the signal light and the idler light matches the phase of the excitation light, and attenuating the signal light when the phases of both become an orthogonal phase relationship in which the phases shifts by 90 degrees. Using this characteristic, by matching the fundamental phase between the signal light and the idler light with the phase of the excitation light to maximize an amplification gain, the phase sensitive amplifier 131 is capable of performing the phase sensitive amplification operation. In this situation, no spontaneous emission light of an orthogonal phase is generated in a synthesized electric field of the signal light and the idler light, and no excessive spontaneous emission light is generated for an in-phase component. Accordingly, the amplification of both the signal light and the idler light is enabled without degrading the signal to noise ratio. Therefore, the phase sensitive amplifier 131 is required to control emission of a continuous wave of the excitation light in synchronization with the fundamental phase between the signal light and the idler light to perform the phase sensitive amplification operation.

The repeater 103 outputs the signal light and the idler light that have been amplified to another repeater 103 or the coherent receiver 104.

The coherent receiver 104 acquires the signal light and the idler light that have been output from the repeater 103. The coherent receiver 104 conducts coherent detection on each the signal light and the idler light. The coherent receiver 104 outputs the signal light that has been subject to the coherent detection to the synthesis unit 106. In addition, the coherent receiver 104 outputs the idler light that has been subject to the coherent detection to the phase conjugate calculator 105.

The phase conjugate calculator 105 acquires the idler light that has been output from the coherent receiver 104. The phase conjugate calculator 105 calculates phase conjugate of the complex amplitude of the idler light that has been acquired. The phase conjugate calculator 105 outputs the phase conjugate of the complex amplitude of the idler light that has been calculated to the synthesis unit 106.

The synthesis unit 106 conducts a diversity synthesis of adding together the signal light that has been output from the coherent receiver 104 and the phase conjugate of the complex amplitude of the idler light that has been output from the phase conjugate calculator 105. Note that the coherent receiver 104, the phase conjugate calculator 105, and the synthesis unit 106 are examples of a reception unit.

As described above, the optical transmission system 100 according to the present embodiment includes a non-degenerate phase sensitive amplifier, and compensates for the phase noise that has been generated by a phase shift between the signal light and the excitation light, in a digital signal process after reception.

Compensation Effect of Phase Noise Due to Diversity Synthesis Reception Hereinafter, a compensation effect of a phase noise due to a diversity synthesis reception will be described. First, normalized complex amplitude $E_s$ of the signal light immediately after having been output from the idler light generator 102 is represented as following Equation (1). In addition, normalized complex amplitude $E_i$ of the idler light immediately after having been output from the idler light generator 102 is represented as following Equation (2).

$$E_s = A_s \exp(j\theta_s) \quad \text{[Math. 1]}$$

$$E_i = A_i \exp(j\theta_i) = A_s \exp(-j\theta_s) \quad \text{[Math. 2]}$$

Here, j represents an imaginary unit. $A_s$ represents modulated amplitude of the signal light. $A_i$ represents modulated amplitude of the idler light. $\theta_s$ represents a modulated phase of the signal light. $\theta_i$ represents a modulated phase of the idler light.

The normalized complex amplitude $E_s^{amp}$ of the signal light that has been subject to optical amplification by the phase sensitive amplifier 131 is represented as Equation (3) below. In addition, the normalized complex amplitude $E_i^{amp}$ of the idler light that has been subject to the optical amplification by the phase sensitive amplifier 131 is represented as Equation (4) below.

$$E_s^{amp} = E_s + E_i^* \exp(j2\varphi) \quad \text{[Math. 3]}$$

$$E_i^{amp} = E_i + E_s^* \exp(j2\varphi) \quad \text{[Math. 4]}$$

Here, φ represents a phase shift between the signal light (and the idler light) and the excitation light.

Figure 2:
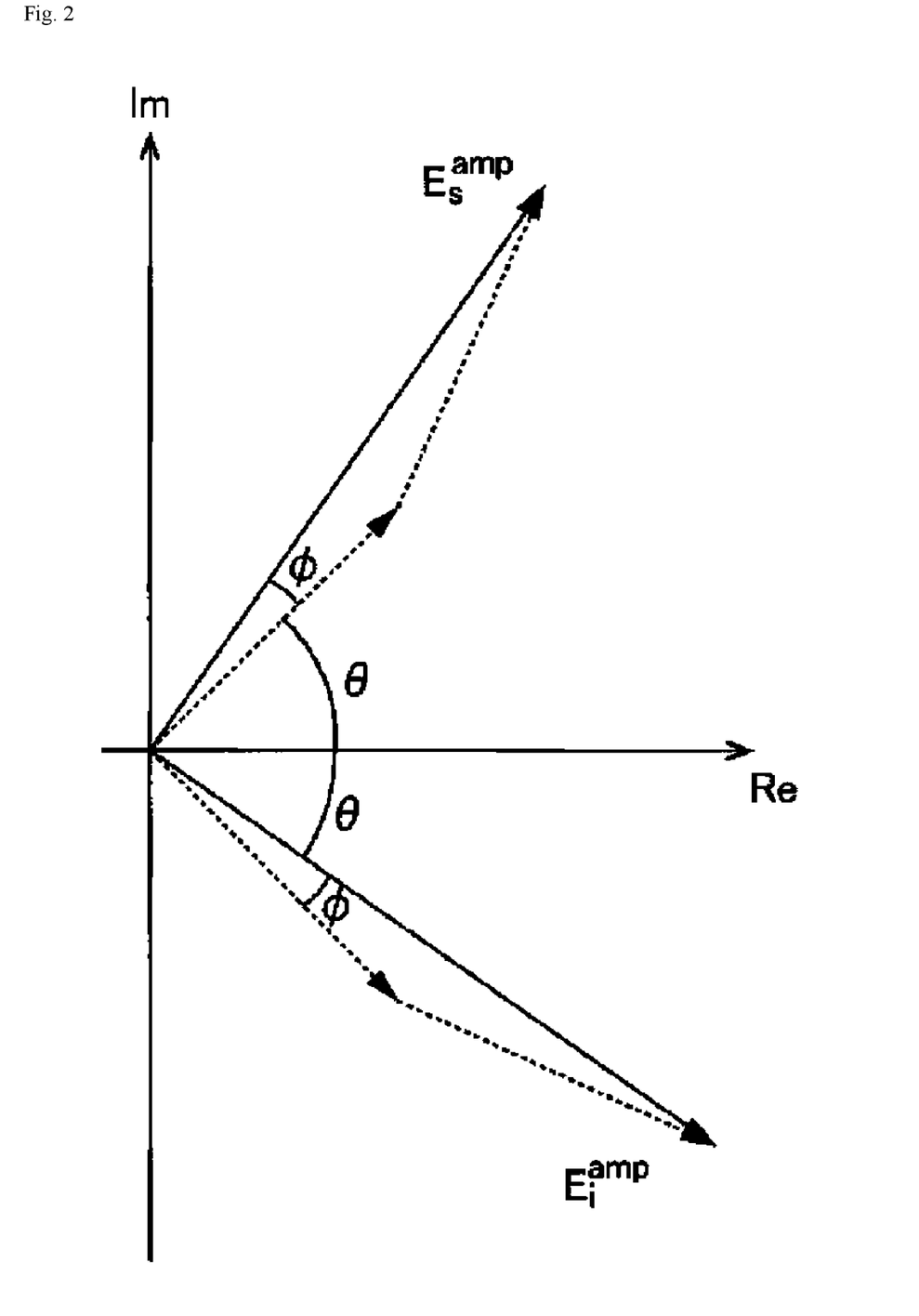
FIG. 2 is a diagram illustrating normalized complex amplitude of a signal light and a normalized complex amplitude of an idler light on a complex plane.

FIG. 2 illustrates the normalized complex amplitude $E_s^{amp}$ (signal point) of the signal light represented by Equation (3) and the normalized complex amplitude $E_i^{amp}$ (signal point) of the idler light represented by Equation (4) are illustrated on a complex plane. As illustrated in FIG. 2, it can be seen that both the signal point of the signal light and the signal point of the idler light have rotated by φ in an identical direction (counterclockwise direction).

The normalized complex amplitude $E_s'$ of the signal light that has been subject to the coherent detection after N times of amplification by the phase sensitive amplifier 131 is represented as following Equation (5). In addition, the normalized complex amplitude $E_i'$ of the idler light that has been subject to the coherent detection after N times of amplification by the phase sensitive amplifier 131 is represented as following Equation (6).

$$E_s' = A_s \exp(j\theta_s)\exp(j\varphi_N) \quad \text{[Math. 5]}$$

$$E_i' = A_i \exp(j\theta_i)\exp(j\varphi_N) \quad \text{[Math. 5]}$$

Here, $\varphi_N$ represents cumulative phase noises that have been generated by passing through N phase sensitive amplifiers 131.

The phase conjugate calculator 105 calculates the phase conjugate of the complex amplitude of the idler light that has been subject to the detection. Then, the synthesis unit 106 performs a diversity synthesis for combining the signal light and the phase conjugate of the complex amplitude of the idler light. The output signal light $E_{out}$ after the diversity synthesis is represented as following Equation (7). In this equation, it is understood that the phase noises are compensated.

$$E_{out} = A_s \exp(j\theta_s)\exp(j\phi_N) + (A_i \exp(-j\theta_i)\exp(j\varphi_N))^* \quad \text{[Math. 7]}$$
$$= A_s \exp(j\theta_s)\exp(j\phi_N) + A_s \exp(j\theta_s)\exp(-j\varphi_N)$$
$$= 2A_s \cos(\varphi_N)\exp(j\theta_s)$$

Operation of Optical Transmission System

In the following, an example of the operation of the optical transmission system 100 will be described.

Figure 3:
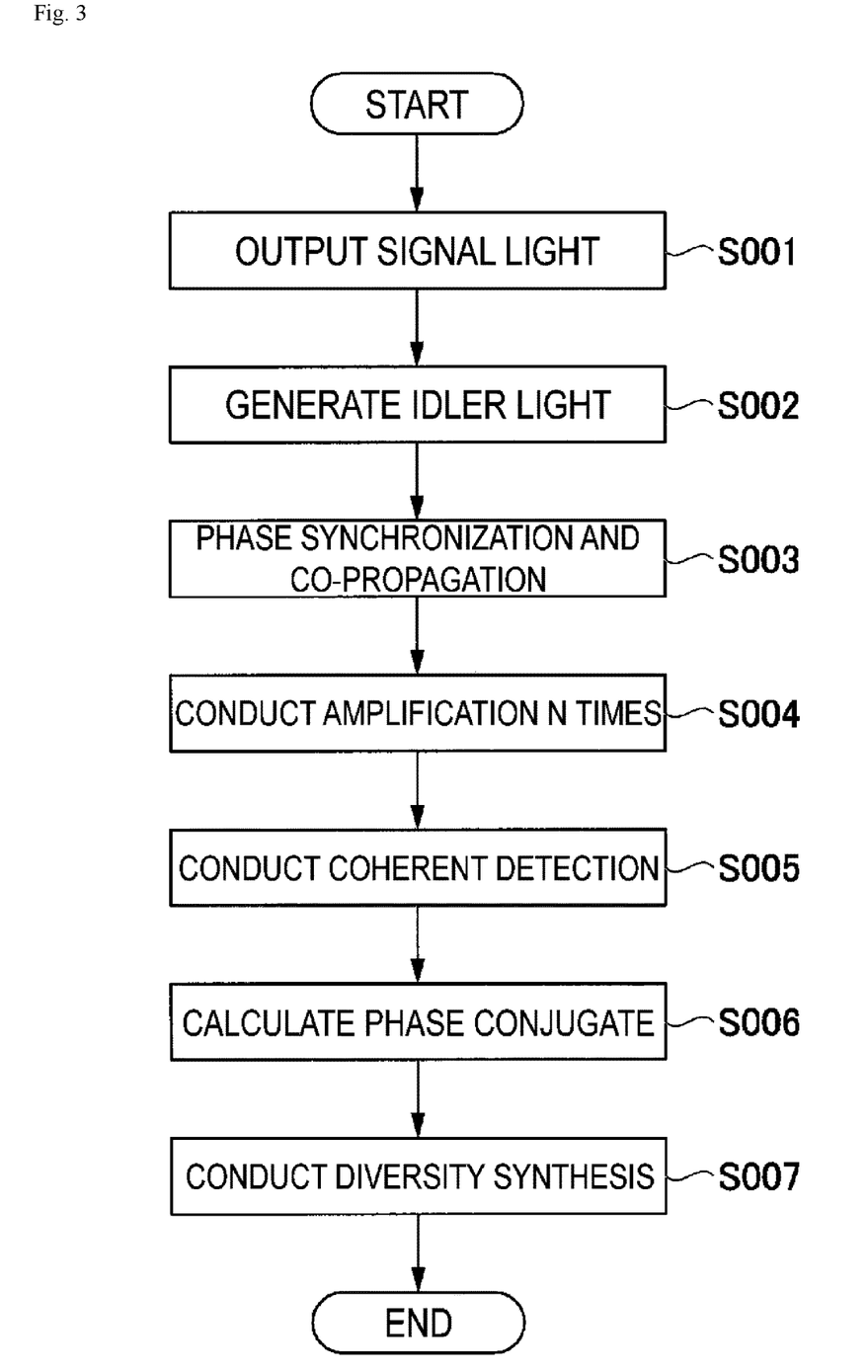
FIG. 3 is a flowchart illustrating an operation of the optical transmission system 100.

FIG. 3 is a flowchart illustrating the operation of the optical transmission system 100 according to an embodiment of the present invention.

The transmitter 101 outputs the signal light to the idler light generator 102 (step S001). The idler light generator 102 generates an idler light, based on the signal light that has been output (step S002). The idler light generator 102 performs phase synchronization on the idler light that has been generated with the signal light for co-propagation, and transmits them to the repeater 103 via a transmission fiber (step S003).

The N repeaters 103 sequentially amplify and output the signal light and the idler light by using the phase sensitive amplifier 131 each being included in the repeater 103. As a result, amplification processes are performed N times (step S004).

The coherent receiver 104 conducts the coherent detection on the signal light and the idler light that have been amplified, respectively (step S005). The phase conjugate calculator 105 calculates the phase conjugate of the complex amplitude of the idler light that has been subject to the coherent detection (step S006). The synthesis unit 106 conducts a diversity synthesis for adding together the signal light and the phase conjugate of the complex amplitude of and the idler light (step S007).

Heretofore, the operation of the optical transmission system 100 illustrated in the flowchart of FIG. 3 ends.

EMBODIMENTS

Hereinafter, a description will be given with regard to an example of a numerical simulation that was performed to confirm effects of the phase noise compensation by the optical transmission system 100 according to the present embodiment. Here, the transmission line was a single mode optical fiber with one span of 80 [km]. In addition, it was assumed that a case where optical repeater transmission was conducted for 20 spans with the phase sensitive amplifiers 131. Note that the wavelength dispersion in the optical fiber was compensated at every span by pre-dispersion compensation, and no consideration was given to the nonlinear optical effect in the transmission optical fiber.

In addition, it was assumed that the phase shift between the signal light and the excitation light occurred with a probability according to a variance 62 and a normal distribution of an average 0. Then, the transmission quality was compared in the signal to noise ratio after an adaptive filter.

Figure 4:
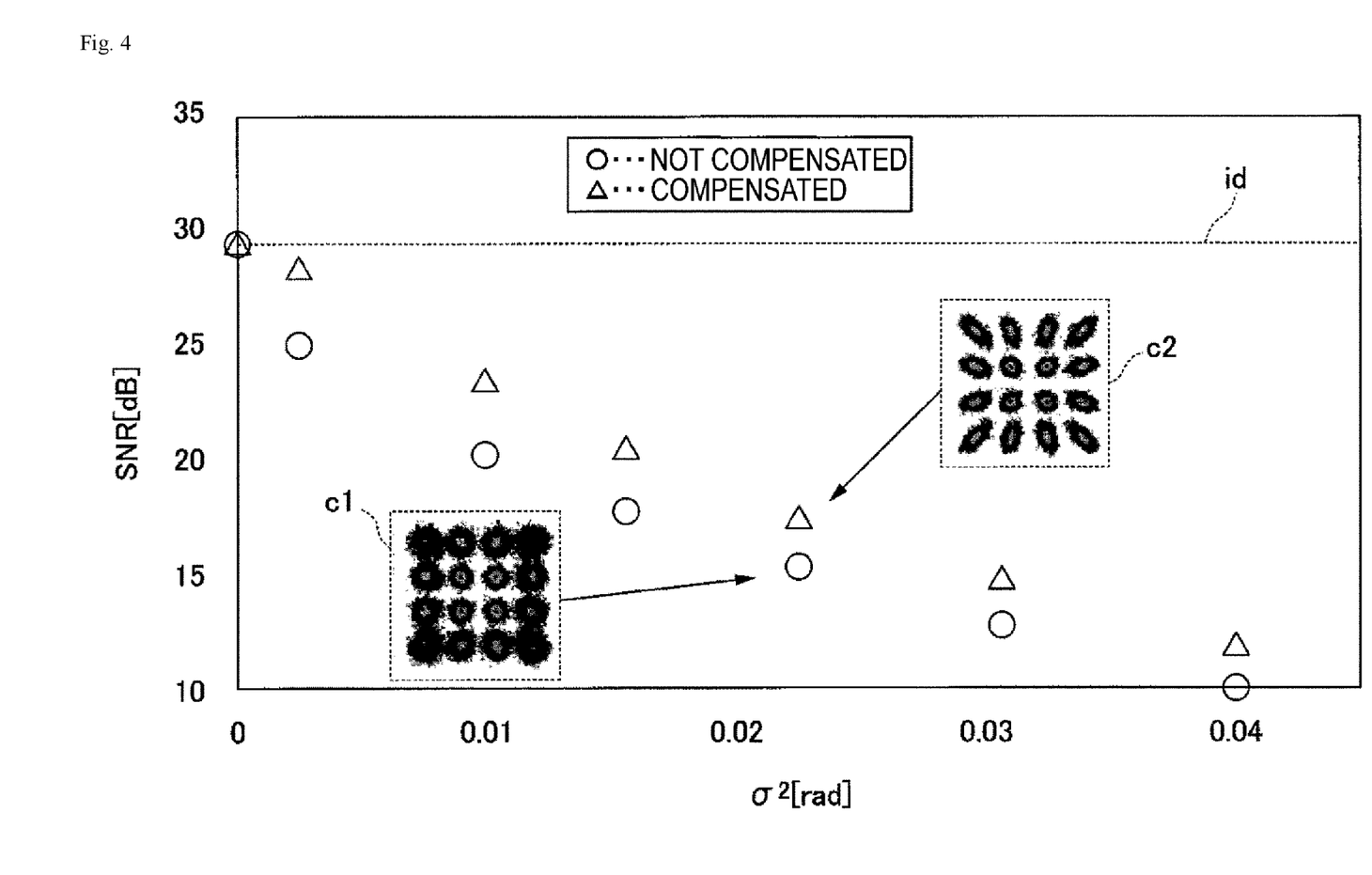
FIG. 4 is a diagram illustrating simulation results.

FIG. 4 is a graph illustrating simulation results. In FIG. 4, the vertical axis represents the signal to noise ratio (SNR) [dB]. The horizontal axis represents a variance 62 [rad] of the phase difference between the signal light and the excitation light. The position of a dotted line id represents an ideal state in which there is no phase shift between the signal light and the excitation light. A round mark represents the signal to noise ratio when no phase noise compensation was made by the optical transmission system 100, in a case where a phase shift occurred between the signal light and the excitation light. A triangle mark represents the signal to noise ratio when the phase noise compensation was made by the optical transmission system 100, in the case where the phase shift occurred between the signal light and the excitation light.

In addition, FIG. 4 illustrates constellation waveforms c1 and c2 respectively at representative points. Note that the constellation waveform c1 indicates a case where no phase noise compensation was made by the optical transmission system 100, and the constellation waveform c2 indicates a case where the phase noise compensation was made by the optical transmission system 100.

As illustrated in FIG. 4, in the case where the phase shift occurs between the signal light and the excitation light, a reduction in the signal to noise ratio is seen. However, the optical transmission system 100 made the phase noise compensation, and it was confirmed that the reduction in the signal to noise ratio was improved by approximately 2 [dB] to 3 [dB]. As illustrated in the constellation waveforms c1 and c2 in FIG. 4, it was confirmed that the degradation in the signal quality was suppressed by the optical transmission system 100 having made the phase noise compensation.

Note that, in order to simplify the simulation, in the simulation described above, it was assumed that neither polarization fluctuation nor polarization mode dispersion in the signal light was present. Note that in a case where the polarization fluctuation and the polarization mode dispersion are present, the diversity synthesis cannot be conducted by using a simple arithmetic operation as indicated in above Equation (7). However, similar processing is enabled by using multiple-input and multiple-output (MIMO) signal processing with both the signal light and the idler light used as inputs. Note that the MIMO signal processing in optical communications denotes a signal processing technique for removing interference between optical signals having different data that propagate in an identical transmission fiber, and for synthesizing the optical signals in which identical data are modulated to obtain gains.

That is, by performing, for example, 2×1 MIMO processing that obtains one demodulated result with the signal light and the idler light used as the inputs, the phase noise that has been generated in the phase sensitive amplifier 131 can be compensated. Alternatively, by performing, for example, 4×2 MIMO processing that obtains the demodulated results of an X polarization component and a Y polarization component, with an X polarization component and a Y polarization component of the signal light and an X polarization component and a Y polarization component of the idler light used as the inputs, the phase noise that has been generated in the phase sensitive amplifier 131 can be compensated.

As described heretofore, the optical transmission system 100 according to an embodiment of the present invention is a system that transmits signals via a non-degenerate phase sensitive amplifier (ND-PSA). The optical transmission system 100 conducts the coherent detection on both the signal light and the idler light, and conducts the diversity synthesis in the digital signal processing after reception. With such a configuration, the optical transmission system 100 is capable of suppressing degradation in the transmission quality, even when the phase noise occurs due to the phase shift between the signal light and the excitation light.

Note that a part of the optical transmission system 100 according to the embodiments described above may be implemented by a computer. In such a case, it may be implemented by recording a program for implementing these functions in a computer-readable recording medium, causing a computer system to read the program recorded in the recording medium, and executing the program. The "computer system" described herein includes an OS or hardware such as a peripheral device. Further, the "computer-readable recording medium" refers to a portable medium such as a flexible disk, a magneto-optical disc, a ROM, or a CD-ROM, or a storage device such as a hard disk built into the computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is a volatile memory inside a computer system that functions as a server or a client in the above-described case. The above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

REFERENCE SIGNS LIST

100 Optical transmission system
101 Transmitter
102 Idler light generator
103 Repeater
104 Coherent receiver
105 Phase conjugate calculator
106 Synthesis unit
131 Phase sensitive amplifier

The invention claimed is:

1. An optical transmission system, comprising:
a transmission unit configured to co-propagate, via an optical transmission medium, a signal light in which data is modulated and an idler light having complex amplitude that is phase conjugate with the signal light;
at least one optical amplifier configured to perform a phase sensitive amplification operation through an action among the signal light, the idler light, and an excitation light in a nonlinear medium; and
a reception unit configured to receive the signal light that has been amplified by the optical amplifier, coherently detect the signal light and the idler light individually, and conduct a diversity synthesis to demodulate the data.

2. The optical transmission system according to claim 1, wherein
the reception unit calculates the complex amplitude to be phase conjugate with the idler light, adds together the complex amplitude and the signal light to compensate for a phase noise that has been generated in the optical amplifier.

3. The optical transmission system according to claim 1, wherein
the reception unit performs a two-input one-output MIMO process of using the signal light and the idler light as input and demodulating one piece of data to compensate for a phase noise that has been generated in the optical amplifier.

4. The optical transmission system according to claim 1, wherein the reception unit performs a four-input two-output MIMO process of using an X polarization component and a Y polarization component of the signal light and an X polarization component and a Y polarization component of the idler light as input and demodulating the X polarization component and the Y polarization component of the signal light and the X polarization component and the Y polarization component of the idler light to one X polarization component and one Y polarization component to compensate for a phase noise that has been generated in the optical amplifier.

5. An optical transmission method implemented by a computer, the optical transmission method comprising:

co-propagating, via an optical transmission medium, a signal light in which data is modulated and an idler light having complex amplitude that is phase conjugate with the signal light;

performing, at least once, a phase sensitive amplification operation through an action among the signal light, the idler light, and an excitation light in a nonlinear medium; and receiving the signal light that has been amplified, coherently detecting the signal light and the idler light individually, and conducting diversity synthesis to demodulate the data.

* * * * *